US010713548B2

(12) United States Patent
Mazurkiewicz et al.

(10) Patent No.: US 10,713,548 B2
(45) Date of Patent: Jul. 14, 2020

(54) MARKER WITH INFORMATION

(71) Applicant: HEWLETT-PACKARD DEVELOPMENT COMPANY, L.P., Spring, TX (US)

(72) Inventors: Paul Howard Mazurkiewicz, Fort Collins, CO (US); Ning Ge, Palo Alto, CA (US); Helen A Holder, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,813

(22) PCT Filed: Oct. 31, 2016

(86) PCT No.: PCT/US2016/059678
§ 371 (c)(1),
(2) Date: Mar. 13, 2019

(87) PCT Pub. No.: WO2018/080535
PCT Pub. Date: May 3, 2018

(65) Prior Publication Data
US 2019/0362205 A1 Nov. 28, 2019

(51) Int. Cl.
G06K 19/06 (2006.01)
G06K 19/02 (2006.01)
G06Q 30/02 (2012.01)

(52) U.S. Cl.
CPC ......... G06K 19/02 (2013.01); G06Q 30/0201 (2013.01)

(58) Field of Classification Search
CPC ... G06K 19/06037; G06K 7/14; G06K 7/1417
USPC ........................................................ 235/494
See application file for complete search history.

(56) References Cited

U.S. PATENT DOCUMENTS

| 6,616,051 B1* | 9/2003 | Zidon ..................... G21G 4/00 235/375 |
| 8,864,038 B2 | 10/2014 | Marka et al. |
| 2003/0178561 A1 | 9/2003 | Neda et al. |
| 2011/0099117 A1 | 4/2011 | Schepers et al. |
| 2013/0240630 A1 | 9/2013 | Hood et al. |
| 2014/0119636 A1* | 5/2014 | Nava ................. H05K 13/0815 382/147 |
| 2014/0201094 A1 | 7/2014 | Herrington et al. |
| 2014/0324347 A1 | 10/2014 | Mazurkiewicz et al. |

FOREIGN PATENT DOCUMENTS

| RU | 2144216 | 1/2000 |
| RU | 2276406 | 5/2006 |

OTHER PUBLICATIONS

Vladimir G. Plekhanov, Isotope-Based Quantum Information, < http://rentals.springer.com/product/9783642287503 >.
(Continued)

Primary Examiner — Ahshik Kim
(74) Attorney, Agent, or Firm — HPI Patent Department

(57) ABSTRACT

An electronic device includes a marker with a pattern of marks encoding product information of the electronic device. The pattern includes first marks having a first material with a first isotopic ratio of an element, and second marks having a second material with a second isotopic ratio of the element different than the first isotopic ratio.

16 Claims, 3 Drawing Sheets

(56) References Cited

OTHER PUBLICATIONS

Vladimir. G. Plekhanov, Isotope-Based Quantum Information, < https://arxiv.org/ftp/arxiv/papers/0909/0909.0820.pdf >.
What is the Most Efficient Information Storage?, < http://physics.stackexchange.com/questions/144694/what-is-the-most-efficient-information-storage >.

* cited by examiner

100

200

300

MARKER WITH INFORMATION

BACKGROUND

Product and marketing information may be available for electronic devices and other products. Aspects of the information may help to understand and better operate the product. Some of the information may be confidential or intended for certain audiences.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
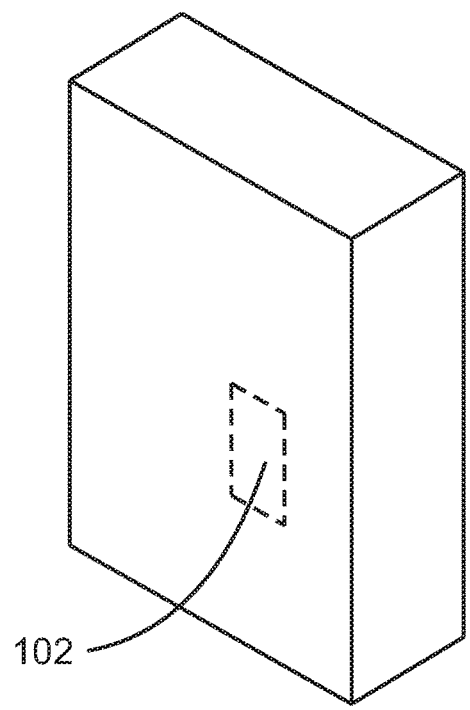
FIG. 1 is a diagram of an electronics device having a marker in accordance with examples.

In examples, a marker may include information. In particular examples, a device may include a marker that encodes information about the device. The marker may be characterized as a chemical marker, material marker, or physical marker, and the like. The device may be an electronics device or other type of device. The information encoded may be product information of the device, such as product identification, marketing information, machine parameters, and so on.

The marker may have a pattern or arrangement of first marks and second marks, and optionally additional marks, to encode or store the information. The first marks have material with a first isotopic ratio of an element. The second marks have material with a second isotopic ratio of the element. The pattern of the first marks and second marks may give, for example, a binary encoding of the information. Other arrangements may give other logic for encoding, such as ternary, a potentially physical unclonable function (PUF), other patterns, and so on. The marker and its encoded information are generally readable, such as via mass spectroscopy or other techniques. The marks may be characterized as physical memory bits not of typical memory.

Memory bits of product information may be an beneficial part of an electronic device or product. Device security may also be beneficial. However, memory bits or product information stored on product memory such as an optical bar code or electronics-based memory including electrically erasable programmable read only memory (EEPROM), flash memory, magnetic memory, and the like, may be compromised by unauthorized entities. Indeed, such memory may be hacked even though on-chip encryption or protection mechanisms have been implemented. Another issue is this typical memory may be fragile to shock, temperature, radio-active impact from the environment, and so on. Also, an optical bar-code, for example, generally does not store a large amount of information, and also the bar-code information is susceptible to undesired change.

A marker may be more secure and relatively undetectable by unauthorized entities, and less susceptible to physical damage. In other words, examples utilize isotope idiosyncrasy to build physical memory inside the electronic device or product that may be relatively hidden and difficult-to-detect to unauthorized entities, and which may enhance product security.

The marker may provide security to an electronic device. For example, to avoid hacking of product information in the electronic device, memory bits of product information are in a readable physical or chemical marker embedded on hardware of the electronic device, such as deposited on a printed circuit board (PCB) or other substrate or hardware component. The marker has different isotopic ratios to encode product information. For instance, an isotopically enriched material (e.g., isotopically enriched tin) is used for a zero, and normal or naturally-occurring material (e.g., naturally-occurring tin) is used for 1. In this particular example, a repeating dot pattern provides a binary encoding of the product information. Other encodings are applicable including, for example, a ternary encoding, quaternary encoding, "n"-ary encoding, a PUF, and so forth. In a specific example, material isotopically enriched with 2% 112Sn and 13.54% 116Sn encodes a zero, and normal or naturally occurring tin (Sn) encodes a 1. A repeating dot pattern of the marks encodes binary information. In general, a marker has different isotopic ratios, and these different ratios could be used to encode information about the product. If a trinary or ternary is employed, for example, the marker may have a pattern with a plurality of first marks having a material or substance with a first isotopic ratio of an element, a plurality of second marks having material with a second isotopic ratio of the element, and a plurality of third marks having a material with a third isotopic ratio of the element. In this example, the first marks each represent or indicate a zero, the second marks each indicate a 1, and the third marks each indicate a 2.

A normal element or normal tin may be characterized as having a stable (e.g., generally non-radioactive) isotopic distribution consistent with what is naturally occurring. For instance, the material or element and its isotopic ratio found on Earth via mining tin ores or other ores. This normal or naturally-occurring material is in contrast to isotopically-enriched tin metal or other enriched element that contains unnatural (not "normal") distributions of isotopes. Examples herein can utilize both naturally occurring and enriched isotopic ratios in the marker to encode information.

Moreover, again, the marker may be a relatively easy-to-hide and hard-to-detect physical memory inside the products. Indeed, the region on the hardware part and the isotope material of the chemical marker may generally be known, for example, to the product owner or manufacturer. Further, as mentioned, the marker may be more resistant to damage than is electronics-based memory such as EEPROM, flash memory, magnetic memory, and optical bar code.

A product or electronics device may have hardware parts such as a housing, chassis, framing, substrate, memory components, circuitry including, for example, a printed circuit board (PCB) or flexible PCB, and the like. The aforementioned marker having marks as embedded isotope-physical memory bits may be formed or placed on one or more these various hardware components. Reading the known region may retrieve isotope-physical memory bit information. Stable isotopes may be utilized. Moreover, this memory region on the hardware component and encoding information may be confidential and known by the manufacturer or product owner. Lastly, in some examples, a PUF may be applicable because the introduction of an isotope, including the pattern area and dose of the isotope, may not be repeatable or easily repeatable, including by an unauthorized entity. In general, the marker with marks of differing isotopic ratios, and characterized as embedded isotope-physical memory bits, may be on a hardware component such as on or inside a PCB, on an internal chassis of the electronics device, and so forth.

FIG. 1 is an electronics device 100 depicted with an arbitrary shape. The electronics device 100 may be a computing device, desktop computer, laptop computer, a tablet, smartphone, audio device, audio/visual device, an appliance, or any type of electronic device having stored product information. The electronics device 100 has a marker 102 disposed in or on hardware of the electronics device 100. For example, the marker 102 may be formed in or deposited on a frame or chassis, or on circuitry such as a PCB of the device 100. Moreover, the marker 102 encodes information about the electronic device.

The marker 102 may be a chemical marker (or material marker, physical marker, etc.) having a pattern or arrangement of marks or spots encoding product information of the electronic device. For example, the pattern may include a first plurality of marks with a first material having a first isotopic ratio of an element, and a second plurality of marks with a second material having a second isotopic ratio of the element different than the first isotopic ratio. In a particular example, the pattern is a binary pattern, wherein the first plurality of marks represents 0, and wherein the second plurality of marks represents 1. In another example, the pattern includes a PUF. As discussed, the product information may include product identification, marketing information, or machine parameters, etc., or any combination thereof. Again, the marker 102 may be formed in or on a hardware component of the electronics device 100. Indeed, the marker 102 may be a readable chemical marker embedded or deposited on hardware of the electronic device 100. In a particular example, the marker 102 is on or in a PCB of the electronic device. The product information encoded in the marker 102 may be encrypted or not encrypted. The product information encoded in the marker 102 may or may not include error detection or correction bits. In some examples, the first material includes the element naturally occurring or isotopically enriched to give the first isotopic ratio, and the second material includes the same element isotopically enriched to give the second isotopic ratio.

Isotope separation or enrichment may be the process of concentrating specific isotopes of a chemical element by removing other isotopes. To isotopically enrich a material or element may be a process by which the relative abundance of the isotopes of a given element are altered, thus producing a form of the element that has been enriched in one particular isotope and depleted in its other isotopic forms. Example techniques to isotopically enrich a material or element may include centrifugation, diffusion (e.g., gas diffusion or liquid diffusion), electromagnetic, laser, chemical methods, electrolysis, etc. For example, centrifugal schemes may rapidly rotate the material such that heavier isotopes go the periphery or closer to an outer radial wall. Diffusion techniques may rely on thermal equilibrium in that two isotopes with the same energy may have different average velocities. Thus, with diffusion, the lighter atoms (or the molecules containing them) may travel more quickly to diffuse through a membrane, for example. Chemical techniques may be beneficial for isotopic enrichment of light atoms such as hydrogen. Lighter isotopes generally tend to react or evaporate more quickly than heavy isotopes.

Figure 2:
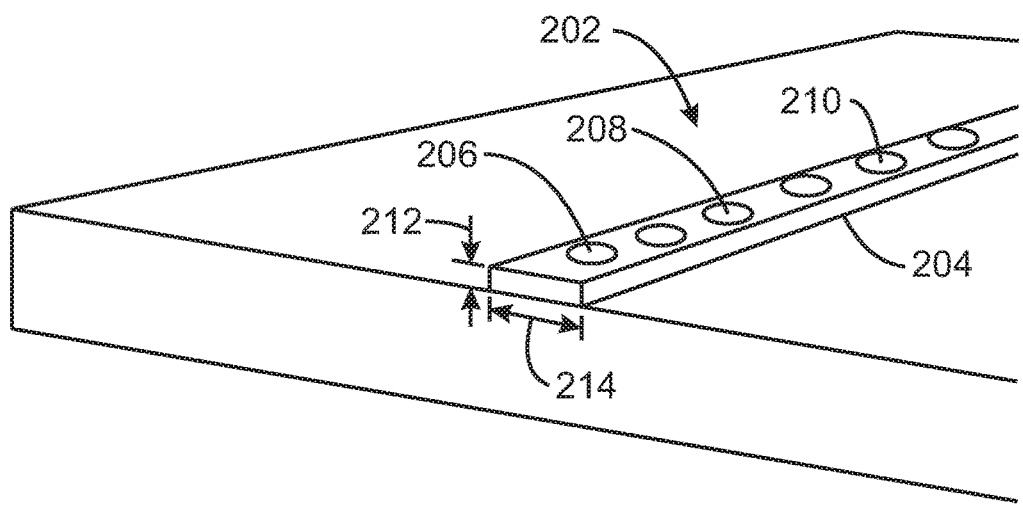
FIG. 2 is a diagram of a marker in an electronics device in accordance with examples.

FIG. 2 is a marker 200 disposed on a hardware component or substrate 202 of an electronics device. In particular, the marker 200 is disposed on a wafer 204 on the substrate 202 and as first marks 206, second marks 208, and optionally third marks 210. In the illustrated example, the wafer 204 has a thickness or height 212 and a width 214. Moreover, in one example, the substrate 202 is electronics or circuits, including flexible electronics. In particular examples, the substrate 202 is a PCB or flexible PCB.

Thus, the marker 200, such as a chemical marker, material marker, or physical marker, may be formed, disposed, deposited, etc., on a hardware component such as a wafer 204 or substrate 202 of an electronics device. The marker 200 may be instead so formed on a chassis, frame, or sidewall, and so on, of the electronics device. The marker 200 includes an arrangement or pattern of at least marks 206 and 208 encoding information about the electronic device. In particular, the marker 200 includes multiple first marks 206 each having an element having a first isotopic ratio, and multiple second marks 208 each having the element having a second isotopic ratio different than the first isotopic ratio. The element may be tin, hydrogen, carbon, copper, gold, or any element having isotopes including stable isotopes, naturally-occurring isotopes, enriched isotopes, etc. The marker 200 pattern may include a binary encoding of the information about the electronic device. In general, the marker 200 is not electronics-based memory or an optical bar code. Yet, the marker 200 may be disposed or deposited on an external surface of an electronics-based memory component.

As for the element with a different isotopic ratio in the first marks 206 and the second marks 208, respectively, the element may be tin as mentioned. Several stable isotopes of tin may be generally available. For example, the common isotopes for tin and their natural abundance ratios are shown in Table 1 below. Also, some hardware components or solder of electronic devices may be tin and, therefore, the marks 206 and 208 as tin may blend with the hardware component or solder and thus may be more hidden from unauthorized entities. However, the present techniques are not limited to tin as the isotopic element.

TABLE 1

| Tin Isotopes | | |
|---|---|---|
| Isotope | Mass/Daltons | Natural Abundance (%)/Atom % |
| 112Sn | 111.904826 (5) | 0.97 (1) |
| 114Sn | 113.902784 (4) | 0.66 (1) |
| 115Sn | 114.903348 (3) | 0.34 (1) |
| 116Sn | 115.902956 (3) | 14.54 (9) |
| 117Sn | 116.902956 (3) | 7.68 (7) |
| 118Sn | 117.901609 (3) | 24.22 (9) |
| 119Sn | 118.903311 (3) | 8.59 (4) |
| 120Sn | 119.9021991 (29) | 32.58 (9) |
| 121Sn | 121.9034404 (30) | 4.63 (3) |
| 124Sn | 123.9052743 (17) | 5.79 |

Figure 3:
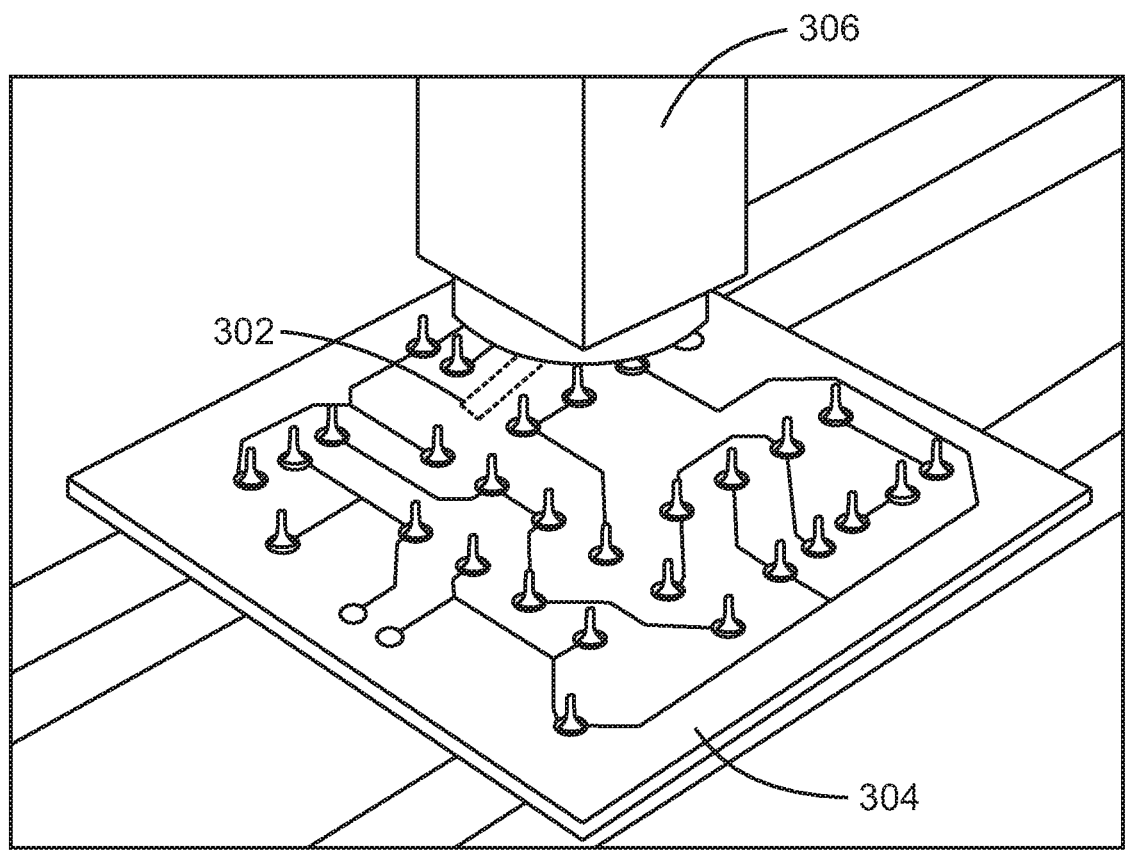
FIG. 3 is a diagram of a substrate having a marker in accordance with examples.

FIG. 3 is a substrate 300 of an electronics device having a marker 302 disposed on the substrate or circuitry. In the illustrated example, the substrate 300 includes a PCB 304. The illustration depicts a mass spectrometer 306 reading the marker 302. Techniques other than mass spectroscopy may be employed to read the mark 302.

The mass spectrometer 306 generally differentiates between the two or more materials (mark types) with different isotopic ratios in the marker 302. For example, the mass spectrometer 306 may be precise enough to give good peaks for each of the materials. In all, the mass spectrometer 306 is generally capable of sufficient resolution to make isotopic abundance measurements. The types of mass spectrometry may include time-of-flight, magnetic sector and quadrupole mass spectrometry with sufficient resolution to differentiate between the isotopically labeled species. Alternatives to mass spectrometry for reading the marker 302 may include measurements by chemical reaction, kinetic techniques, or other analytical devices, and so forth.

In the illustrated example of FIG. 3, the substrate 300 or PCB 304 has been removed from the electronics device for reading of the marker 302. The bars depicted are a support structure for measuring the isotopic abundance ratios on the PCB 304. However, in other examples, the marker 302 may be read with the substrate 300 or PCB 304 remaining in place in the electronics device.

As discussed, the marker 302 may be a chemical marker (or material marker, physical marker, etc.) having a pattern or arrangement of marks or dots encoding information about the electronic device. For example, the arrangement or pattern may multiple first marks with a first material or substance having a first isotopic ratio of an element, and multiple second marks with a second material or substance having a second isotopic ratio of the element different than the first isotopic ratio. Indeed, the pattern may encode the product information, for example, in binary form. In another example, the pattern includes a PUF.

Figure 4:
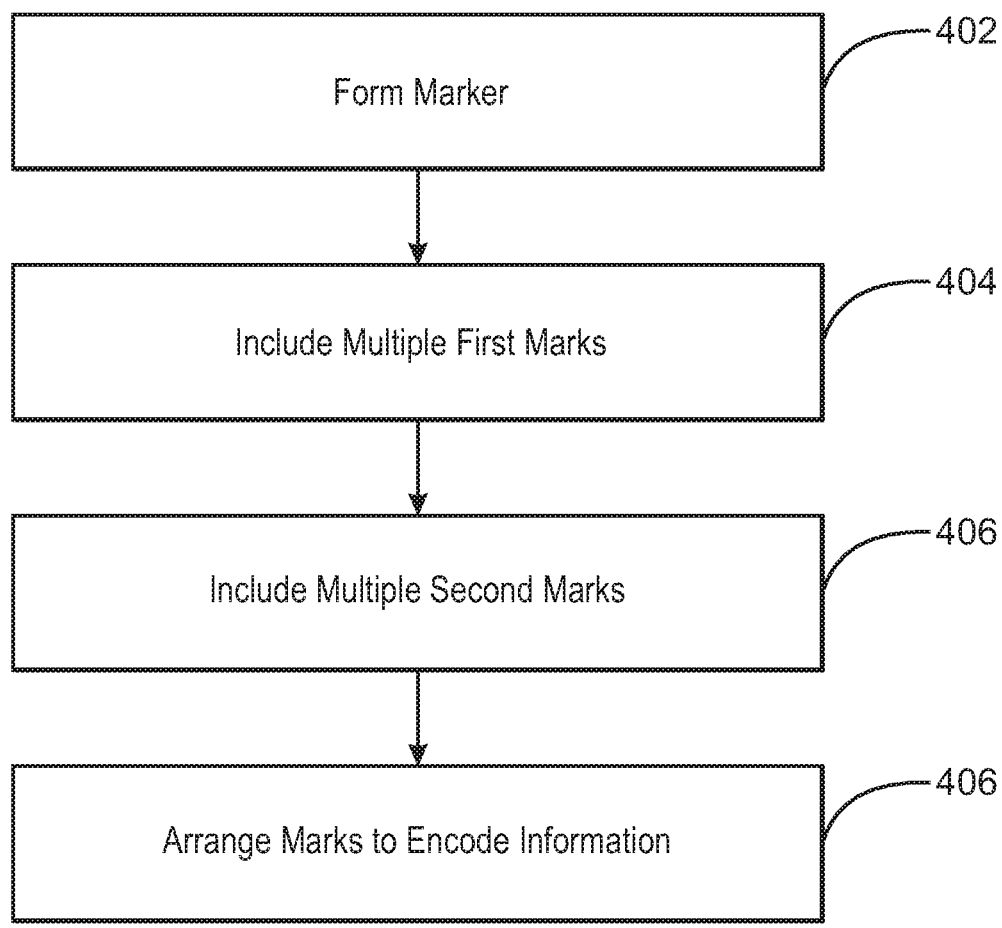
FIG. 4 is a block diagram of a method of manufacturing an electronics device in accordance with examples.

FIG. 4 is a method 400 of manufacturing an electronics device having a marker. At block 402, the method includes forming a physical marker (e.g., chemical marker, material marker, etc.) on a hardware component of the electronic device. The physical marker may include an arrangement of marks or spots to encode product information of the electronic device.

At block 404, the method includes having multiple first marks in the marker arrangement. The multiple first marks each include a first substance having a first isotopic ratio of an element. At block 406, the method includes having multiple second marks in the marker arrangement. The second marks each have a second substance having a second isotopic ratio of the element different than the first isotopic ratio. The marker may include additional marks with other isotopic ratios of the element. Also, the marker may be or include a PUF. At block 408, the method notes that the marker arrangement or pattern of at least the first marks and the second marks encodes product information of the electronic device.

In some examples, the first substance is with the element not isotopically enriched or is isotopically enriched to give the first isotopic ratio, and the second substance is the element isotopically enriched to give the second isotopic ratio. As discussed, various techniques (e.g., centrifuge implementations, diffusion, etc.) may be employed to isotopically enrich an element. Also, forming the physical marker may include depositing the physical marker on the hardware component. In other examples, the first material or substance is or includes a naturally-occurring stable isotope of tin or isotopically-enriched tin, and the second material or substance is or includes an isotopically-enriched tin. In yet other examples, the first substance and the second substance are each a different one of protium, deuterium, or tritium. Other elements having isotopes are applicable. Further, the physical marker may be embedded physical memory bits, and wherein the physical marker is not EEPROM, flash memory, magnetic memory, or an optical bar code. The memory bits may be physical in a sense of a physical material composition.

In general, the one substance or material of the marker may have a naturally occurring isotope ratio of an element, and another substance or material of the marker may have a deviation from naturally occurring. Also, in examples with respect to the marks (e.g., spots, dots, deposits, etc.) of the marker, the first marks may be with a first pure isotope of the material or element, and the second marks with a second pure isotope of the same material or element. The first marks or second marks (or third marks of the marker) may include a mixture of the first and second pure isotope. Further, multiple elements may be included in each mark or dot, and the isotopic ratios of each element may be changed. The number of elements multiplied by the number of possible isotopic ratios may give the number of possible values per mark or dot. However, the number of possible isotopic ratios may be different for different elements included in the dot.

Various patterns or arrangements of the marks or isotopes may be implemented to encode product information, such as binary, ternary, quaternary, "n"-ary, x-y coordinates, x-y-z coordinates, PUF, steganography patterns, and so forth. As for a PUF, a PUF may be a physical structure that is relatively easy to evaluate but difficult to predict. The physical structure may be unique due to, for example, random physical aspects introduced in forming or manufacturing of the PUF. These physical aspects or features may be unpredictable and uncontrollable which can make the PUF structure nearly impossible to duplicate. Indeed, a PUF may be easy to make but practically impossible to duplicate, even given the exact manufacturing process that produced the PUF.

In this respect, the present marker as a PUF may be a pattern created that is not reproducible due to some inherent limitation of production with precision and accuracy. In examples, the technique may read the PUF with precision and accuracy, and with the inherent variation in the pattern detectable but generally not susceptible to being copied. The PUF may be a mixture of isotopes that have some variation. The mixture can be made in a sufficiently complex manner such that the PUF is very hard to duplicate but easy to read.

Examples may mix the different isotope material into the physical bits to give the ratio and area of the patterned bits for the marker. In some examples, machine errors not controllable below the machine limit (e.g., <1 part per million or ppm level of the ratio, <1 micron for the size, etc.) beneficially give randomness or uniqueness for the PUF for the physical material bits. Such machines may include an ion implantation machine for the isotype introduction, a lithography tool for the physical bit area definition, and so forth.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. An electronic device comprising:
  a chemical marker comprising a pattern of marks encoding product information of the electronic device, the pattern comprising:
    a first plurality of marks comprising a first material having a first isotopic ratio of an element; and
    a second plurality of marks comprising a second material having a second isotopic ratio of the element different than the first isotopic ratio.

2. The electronic device of claim 1, wherein the pattern encodes the product information in a binary form, wherein the first plurality of marks represents 0, and wherein the second plurality of marks represents 1.

3. The electronic device of claim 1, wherein the pattern comprises a physical unclonable function (PUF).

4. The electronic device of claim 1, wherein the product information comprises product identification, marketing information, or machine parameters, or any combination thereof.

5. The electronic device of claim 1, comprising a hardware component, wherein the chemical marker is formed in or on the hardware component.

6. The electronic device of claim 1, wherein the chemical marker comprises a readable chemical marker embedded on hardware of the electronic device.

7. The electronic device of claim 1, wherein the chemical marker is on or in a printed circuit board (PCB) of the electronic device, wherein the product information is not encrypted, and wherein the first material comprises the element naturally occurring or isotopically enriched to give the first isotopic ratio, and the second material comprises the element isotopically enriched to give the second isotopic ratio.

8. A hardware component for an electronic device, the hardware component comprising:
    a material marker formed on or in the hardware component, the material marker comprising a pattern of marks encoding information about the electronic device, the material marker comprising:
        first marks comprising an element having a first isotopic ratio; and
        second marks comprising the element having a second isotopic ratio different than the first isotopic ratio.

9. The hardware component of claim 8, wherein the pattern encodes a binary of the information about the electronic device.

10. The hardware component of claim 8, wherein the hardware component comprises a printed circuit board (PCB).

11. The hardware component of claim 8, wherein the element is tin, hydrogen, or carbon, and wherein the material marker is not readable electronically or optically.

12. A method of fabricating an electronic device, comprising:
    forming a physical marker on a hardware component of the electronic device, the physical marker comprising an arrangement of marks to encode product information of the electronic device, the arrangement comprising:
        multiple first marks comprising a first substance having a first isotopic ratio of an element; and
        multiple second marks comprising a second substance having a second isotopic ratio of the element different than the first isotopic ratio.

13. The method of claim 12, wherein the first substance comprises the element not isotopically enriched or is isotopically enriched to give the first isotopic ratio, and the second substance comprises the element isotopically enriched to give the second isotopic ratio.

14. The method of claim 12, wherein forming the physical marker comprising depositing the physical marker on the hardware component, and wherein the first substance comprises naturally-occurring or isotopically-enriched tin, and the second substance comprises isotopically-enriched tin.

15. The method of claim 12, wherein the physical marker comprises embedded physical memory bits, and wherein the physical marker is not readable electronically, magnetically, or optically.

16. The method of claim 12, wherein the first substance and the second substance are each a different one of protium, deuterium, or tritium.

* * * * *